United States Patent [19]

DiPaola et al.

[11] Patent Number: 4,674,801
[45] Date of Patent: Jun. 23, 1987

[54] ENERGY ABSORBER HAVING A LIMITED STROKE

[75] Inventors: Donald A. DiPaola, Mt. Clemens; Robert M. Kremer; Kevin C. Gallagher, both of Fraser, all of Mich.

[73] Assignee: Allied Corporation, Morris Township, Morris County, N.J.

[21] Appl. No.: 930,038

[22] Filed: Nov. 10, 1986

Related U.S. Application Data

[63] Continuation of Ser. No. 698,670, Feb. 6, 1985, abandoned.

[51] Int. Cl.⁴ .............................................. B60R 22/16
[52] U.S. Cl. ................................. 297/472; 24/115 H; 297/216; 297/468
[58] Field of Search ............... 297/468, 470, 471, 472, 297/216; 24/115 H, 115 A, 129 W, 129 A, 129 B, 122.6

[56] References Cited

U.S. PATENT DOCUMENTS

| | | | |
|---|---|---|---|
| 1,391,457 | 9/1921 | Buckley et al. | 24/129 B X |
| 1,601,270 | 9/1926 | Tippett | 24/129 B |
| 1,686,288 | 10/1928 | Meals | 24/129 A |
| 2,637,084 | 5/1953 | Lorentzen | 24/129 W X |
| 2,895,195 | 7/1959 | Ehmann . | |
| 3,008,208 | 11/1961 | Stephan . | |
| 3,026,972 | 3/1962 | Hendry et al. | 297/472 X |
| 3,067,570 | 12/1962 | Nischan . | |
| 3,079,192 | 2/1963 | Otley | 24/129 B X |
| 3,089,564 | 5/1963 | Smittle | 297/472 X |
| 3,174,780 | 3/1965 | Shapiro | 24/129 X |
| 3,562,874 | 2/1971 | Dipalma . | |
| 3,909,142 | 9/1975 | Surr | 24/122.6 X |
| 4,119,344 | 10/1978 | Kondo . | |
| 4,194,786 | 3/1980 | Gilmore . | |
| 4,199,190 | 4/1980 | Lindblad . | |

FOREIGN PATENT DOCUMENTS

| | | | |
|---|---|---|---|
| 2621983 | 12/1977 | Fed. Rep. of Germany | 297/472 |
| 2646998 | 4/1978 | Fed. Rep. of Germany | 297/472 |
| 827938 | 5/1938 | France | 24/129 W |

Primary Examiner—Peter A. Aschenbrenner
Assistant Examiner—Thomas A. Rendos
Attorney, Agent, or Firm—Russel C. Wells; Markell Seitzman

[57] ABSTRACT

A shock absorber for a safety restraint system having a loop of wire whose opposite ends entrained through a ferrule and crimped therein. The opposite ends of the wire have a predetermined free length extending beyond the ferrule. Stop members attached to the ends of the free lengths prevent the ends of the wire from being pulled through the ferrule when the applied energy exceeds the energy absorbing capabilities of the energy absorber.

1 Claim, 6 Drawing Figures

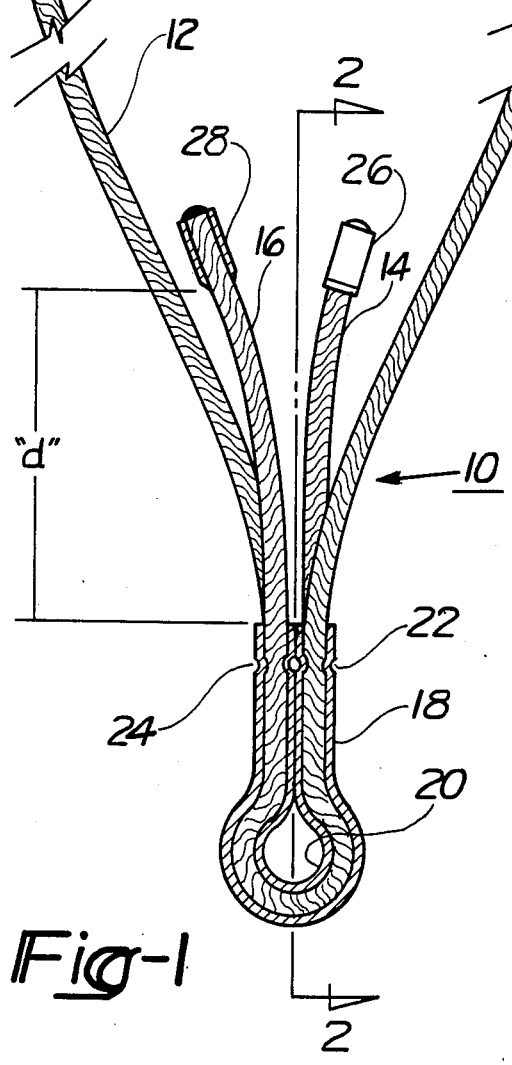
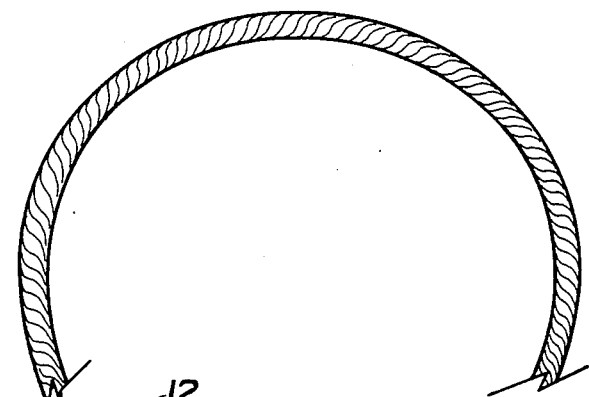
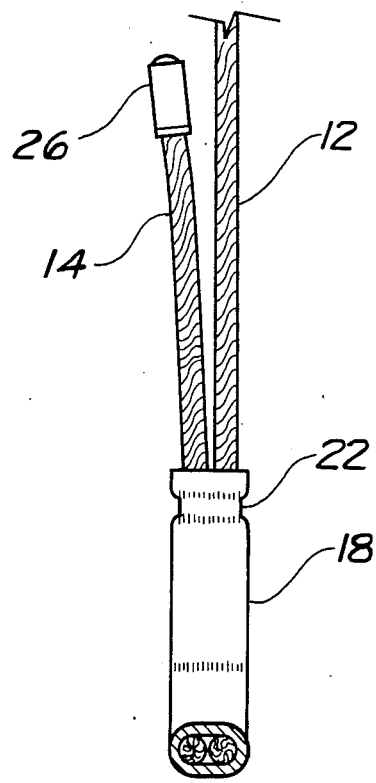
Fig-1  Fig-2  Fig-3  Fig-4

ENERGY ABSORBER HAVING A LIMITED STROKE

This application is a continuation of application Ser. No. 698,670 filed Feb. 6, 1985, now abandoned.

BACKGROUND OF THE INVENTION

1. Field of the Invention

The invention is related to automotive safety restraint systems and in particular to an energy absorber connected between a structural member of the vehicle and a member of the safety restraint system.

2. Prior Art

Load limiting or energy absorbing devices are well known in the art for limiting the maximum applied stress and for reducing the ultimate strength requirements of a load restraint system. Most mechanical energy absorbing devices utilize the plastic deformation of a wire or blade in which the deformation forces absorb the energy when it exceeds predetermined limits.

Energy absorbers provide two useful functions in safety restraint systems such as conventionally used in aircraft or automotive vehicles. During a crash condition, energy absorbers reduce the ultimate strength requirement of the safety restraint system, and reduce the maximum loading on the occupant thereby lowering the risk of internal injuries. The requirements for energy absorbers in automotive safety restraint systems is becoming increasingly important as the trend towards smaller vehicles brings about a corresponding increase in the loads being transmitted to the restrained occupants.

One such energy absorbing device presently being used in safety restraint systems is the energy absorber disclosed by Lindblad in U.S. Pat. No. 4,199,190 in which the opposite ends of a length of wire are captivated in a common ferrule. The energy is absorbed by the plastic deformation of the wire as it is pulled through a crimped area of the ferrule. The problem with this type of energy absorber is that its energy absorbtion capabilities are limited by the length of wire contained in the ferrule. Therefore the crimping of the ferrule must be adjusted so that the energy capable of being absorbed is greater than the total energy induced in the system under the severest crash conditions so that neither end of the wire will be pulled free of the ferrule. Unfortunately these constraints limit the lowest breakaway level at which the energy absorber will yield and it has been found that a minimum breakaway level satisfying the above conditions is sufficiently high to pose a higher than desired risk of internal injuries to the occupant.

As an alternative, the minimum breakaway load level could be reduced by decreasing the severity of the crimp in the ferrule and increasing the length of the free ends of the wire. However under higher crash loads, it was found that the extension of the energy absorber, with a reduced breakaway load level, provided excessive slack in the safety restraint system, and the occupant was no longer restrained from forceably engaging the interior parts of the vehicle. Therefore this solution is unacceptable. The invention is an energy absorber which overcomes the problems encountered with this type of energy absorber.

SUMMARY OF THE INVENTION

The invention is an energy absorber for a safety restraint system of the type having a ferrule adapted to be attached to a structural member of the vehicle, and a loop of wire adapted to be connected to the buckle of the safety restraint system, said loop of wire having its opposite ends entrained in the ferrule and frictionally locked therein wherein said frictional locking of the ends of said loop of wire has a predetermined breakaway force. The improvement to this type of energy absorber characterized by said loop of wire having a free end portion at each end thereof extending a predetermined distance beyond said ferrule and stop means provided at the ends of said free end portions to limit the extension of said loop of wire by a force imparted to the safety restraint system exceeding the energy absorbtion capabilities of the energy absorber.

The advantages of the invention are that the extension of the energy absorber is limited by the stops provided on the free end portions of the wire to prohibit the occupant of the safety restraint system from forceably engaging the interior of the vehicle. The use of these stops, further permits the breakaway force of the frictional locking of the wire in the ferrule to be reduced to a level which will minimize the potential of internal injuries to the occupant by the safety restraint system for all crash conditions except those in which the energy imparted to the safety restraint system exceeds the energy absorbing capabilities of the energy absorber.

These and other advantages of the energy absorber will become more apparent from a reading of the specification in conjunction with the appended figures.

BRIEF DESCRIPTION OF THE FIGURES

FIG. 1 is a frontal cross-sectional view of the energy absorber.

FIG. 2 is a partial cross section of the energy absorber taken along sectional line 2—2 of FIG. 1.

FIG. 3 is a cross-sectional view of an alternate embodiment of the stop member.

FIG. 4 is an alternate embodiment of the stop member.

DETAILED DESCRIPTION OF THE INVENTION

Figure 5:
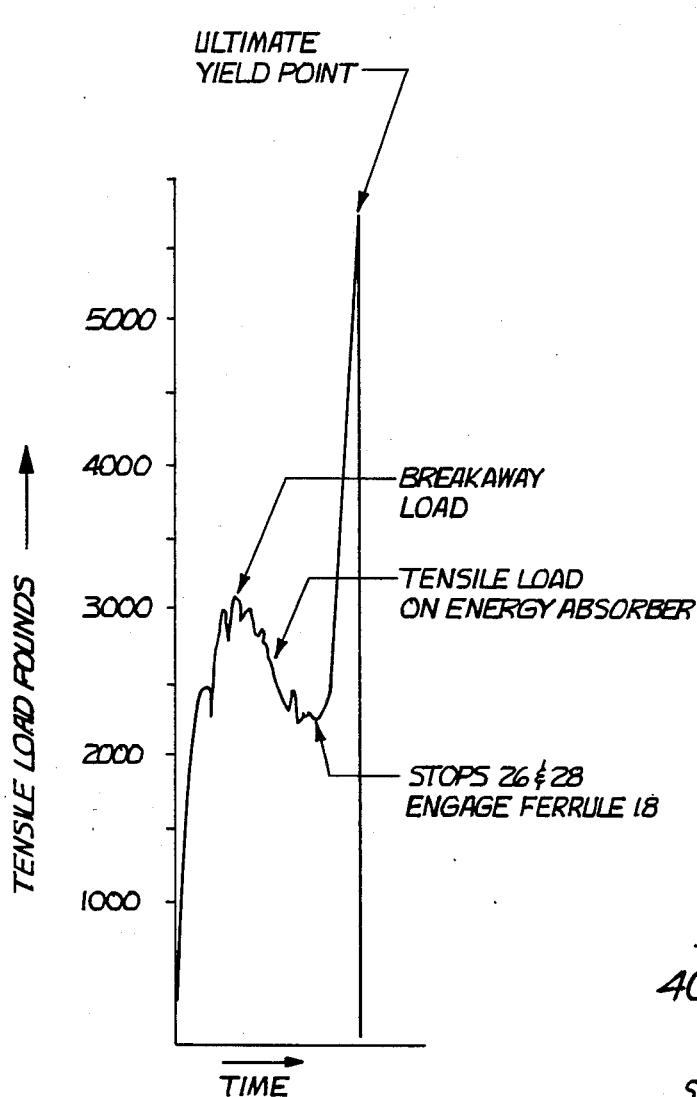
FIG. 5 is a graph showing the behavior of the energy absorber in response to an applied force.

Referring to FIGS. 1 and 2, the energy absorber 10 comprises a length of steel cable or wire 12 having free end portions 14 and 16 entrained through a tubular ferrule 18 in opposite directions. The wire 12 may be a single solid element or a length of multi-strand steel cable as shown. After the wire 12 is entrained through tubular ferrule 18, the ferrule 18 is bent to form an eyelet as shown having an aperture 20 for receiving a tiedown bolt or rivet as shall be explained hereinafter. The ferrule 18 is then swaged or crimped at various locations, such as crimps 22 and 24, to frictionally lock adjacent portions of the wire 12 together and to the ferrule 18 such that the breakaway or yield point of the frictional forces holding the wire 12 locked in the ferrule 18 has a predetermined breakaway value which minimizes the possible internal injuries to the occupant by the safety restraint system.

A pair of stops 26 and 28 are fixedly attached to the ends of the free end portions 14 and 16 of the wire 12 which extends a predetermined distance from the ferrule 18. This predetermined distance "d", referred to as the "stroke", is the maximum elongation of the energy absorber allowable to prevent the occupant from forceably engaging the interior of the vehicle during a crash condition such as hitting his or her head against the dashboard, steering wheel or windshield. The stops 26 and 28 may be welded to the ends 14 and 16 of wire 12 as shown in FIGS. 1 and 2, may be swaged or crimped in place as shown in FIG. 3, or the ends of the wire 14 may be fused to form a ball 29 as shown in FIG. 4.

The ends of the stops 26 and 28 facing ferrule 18 may be chamfered as shown in FIGS. 2 and 3 or be flat as shown in FIG. 1. The chamfer on the ends of the stops 26 and 28 will plastically deform the openings at the opposite ends of the ferrule 18 when the energy absorber reaches the end of its stroke making the transition from its energy absorbing state to its rigid state less abrupt. The chamfer will also produce a circumferential force increasing the locking friction between the wire 12 and the stops 26 and 28 as the ends of the ferrule 18 are deformed.

In the event of a crash condition producing a force which exceeds the breakaway force of the energy absorber, the ferrule 18 and wire 12 will be plastically deformed as it is pulled through the crimps 22 and 24 absorbing the forces above a breakaway value so that the maximum forces imposed on the occupant by the safety restraint system is relatively independant of the crash force itself until the cylindrical stops 26 and 28 engage the ferrule ends as shown in FIG. 5. When the energy of the crash force exceeds the energy absorbing capabilities of the energy absorber, both free end portions 14 and 16 of wire 12 will be pulled through the ferrule 18 until the stops 26 and 28 engage the ends of ferrule 18 terminating the energy absorbtion of the energy absorber 10. Thereafter, the remaining energy will be directly transmitted to the safety restraint system.

Referring to FIG. 5, the graph shows the effectiveness of the energy absorber in reducing the tensile load on the safety restraint system during a simulated crash condition. Up to a breakaway value of approximately 3,000 pounds the load on the safety restraint system rises rapidly, the same as it would if there was no energy absorber present. After breakaway, the load on the energy absorber 10 which is approximately equal to the load or force on the occupant, will decrease slightly to about 2,500 pounds since the wire 12 is now sliding through the ferrule 18. The reduction of the load on the energy absorber is because the sliding friction between the adjacent portions of wire 12 and the ferrule 18 is less than the breakaway value.

Even as the crash load increases, the load on the energy absorber will remain relatively constant will the stops 26 and 28 engage the ferrule 18. After the stops 26 and 28 engage the ferrule, the load on the energy absorber 10 will increase rapidly, and act as a structurally rigid member up to the ultimate strength of the wire 12.

Figure 6:
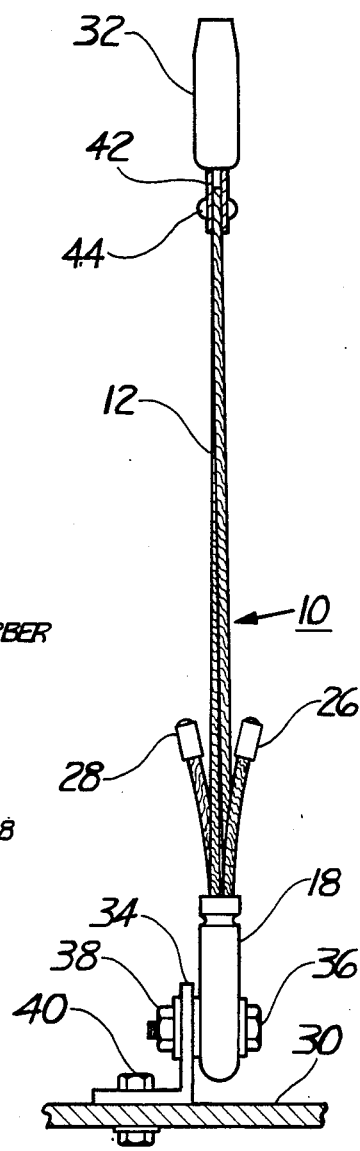
FIG. 6 is an end view of the energy absorber connected between a structural member of the vehicle and the buckle of a safety restraint system.

FIG. 6 shows the energy absorber 10 connected between a structural member of the vehicle, such as the floor 30 and a seat belt buckle 32 which receives in a locking fashion a tongue plate connected to the safety restraint system's seat and shoulder belts, (not shown).

The ferrule 18 is pivotably attached to a mounting bracket 34 by means of a bolt 36 and nut 38. The mounting bracket 34 is bolted to the vehicle's floor 30 by means of bolt 40. As is known in the art, the bolt 36 and nut 38 may be replaced by a rivet or the mounting arrangement may include a friction clutch such as disclosed in commonly assigned patent application Ser. No. 652,781 filed on Sept. 9, 1984, A SELF-STANDING SEAT BELT BUCKLE MOUNT FOR AUTOMOTIVE VEHICLES. The end of the wire 12 opposite ferrule 18 is entrained through an opening of an attachment bracket 42 of seat belt buckle 32 and captivated in place by a rivet 44. As is known in the art, the portion of the wire 12 between the bracket 34 and the seat belt buckle 32 may be encased in a semi-rigid sleeve (not shown) which supports the seat belt buckle 32 at a level approximately equal to the height of the occupants seat to provide the occupant convenient access to the buckle 32.

The energy absorber has three advantages over the ones taught by the prior art:

First, the elongation of the energy absorber is limited by stops 26 and 28 to prevent excessive slack in the safety restraint system which would otherwise permit the occupant to forceably engage the interior of the vehicle during crash conditions.

Second, the stops 26 and 28 are provided on the ends of the wire 12 prevent the ends 14 and 16 from being disengaged from the ferrule 18 even under severe crash conditions thereby assuring that the safety restraint system will restrain the occupant from forceably engaging the interior of the vehicle.

Finally, because the elongation is limited by the stops 24 and 26, the breakaway force of the energy absorber 10 can be reduced to level where the risk of internal injuries to the occupant by the safety restraint system is reduced to a minimum under all crash conditions except for extreme cases.

It is anticipated that the energy absorber described in the specification and shown in the drawings may be modified by a person skilled in the art without departing from the spirit of the invention as set forth in the appended claims or may be useful in applications other than in combination with a safety restraint system.

In the claims:

1. An energy absorber having a limited stroke for use in a safety restraint system comprising:
   a length of cable forming a loop with the ends of the cable overlapping each other in opposite directions with a predetermined length of cable at each end of said cable extending beyond the overlapped portion of the loop,
   a buckle of the safety restraint system connected at one end of said loop;
   a tubular ferrule forming an aperture for receiving means to fasten said loop to a vehicle and enclosing a portion of the overlapped portion of said loop at an end opposite said buckle with the predetermined lengths of said cable extending beyond said ferrule, said ferrule having at least one swaged portion producing a predetermined breakaway frictional force securing the adjacent portions of the overlapping portion of said cable to each other and to said ferrule; and
   stop means fixedly attached at each end of said predetermined length of cable for prohibiting the ends of said cable from being pulled through said ferrule when said predetermined breakaway frictional force is exceeded by forces being applied to the safety restraint system by the vehicle occupant at the moment of impact in a vehicle crash whereby the occupant's forward movement is absorbed by said predetermined lengths of said cable slipping through said ferrule until said slipping is prohibited by said stop means.

* * * * *